United States Patent [19]
Gilbert

[11] 3,856,630
[45] Dec. 24, 1974

[54] EVAPORATOR FABRICATED FROM PRE-FORMED SHEETS

[75] Inventor: Frederick W. Gilbert, Shreveport, La.

[73] Assignee: Riley-Beaird Inc., Chicago, Ill.

[22] Filed: Jan. 10, 1973

[21] Appl. No.: 322,322

[52] U.S. Cl. .............................. 202/173, 159/2 MS
[51] Int. Cl. ........................... B01d 1/28, B01d 3/02
[58] Field of Search .......... 159/2 MS; 202/173, 174; 203/11

[56] References Cited
UNITED STATES PATENTS

| | | | |
|---|---|---|---|
| 3,228,859 | 1/1966 | Frankel et al. ...................... | 202/173 |
| 3,457,142 | 7/1969 | Starmer ............................. | 203/11 X |
| 3,488,260 | 1/1970 | Gilbert.............................. | 203/11 X |
| 3,489,650 | 1/1970 | Williamson ....................... | 203/11 X |
| 3,595,757 | 7/1971 | Izumi ................................ | 202/173 |
| 3,713,989 | 1/1973 | Bom ............................ | 159/2 MS X |

Primary Examiner—Jack Sofer
Attorney, Agent, or Firm—Mason, Kolehmainen, Rathburn & Wyss

[57] ABSTRACT

Multi-stage flash evaporator fabricated from pre-formed bent sheets which provide at least two adjacent walls or members, thereby simplifying construction and eliminating much welding.

9 Claims, 4 Drawing Figures

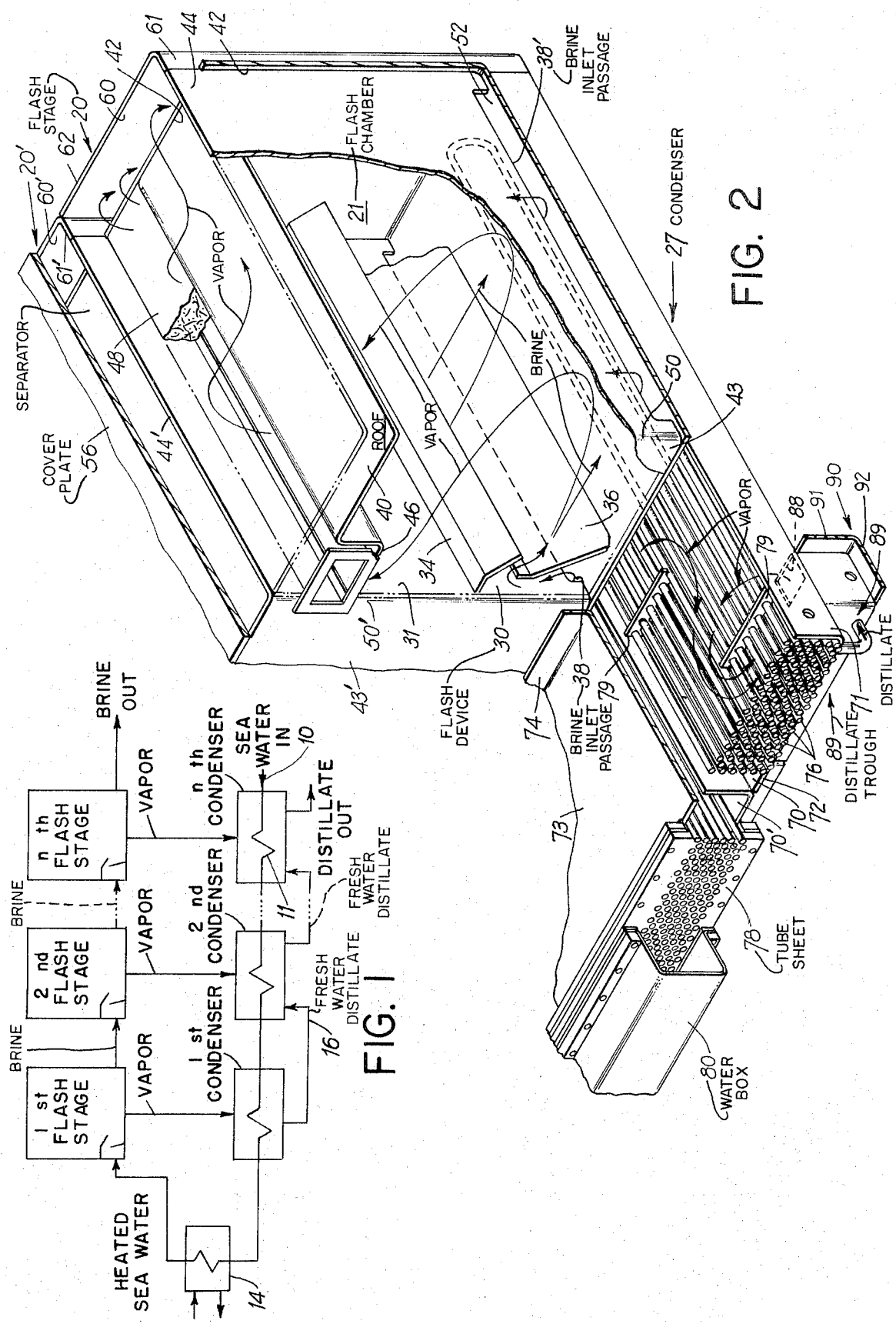

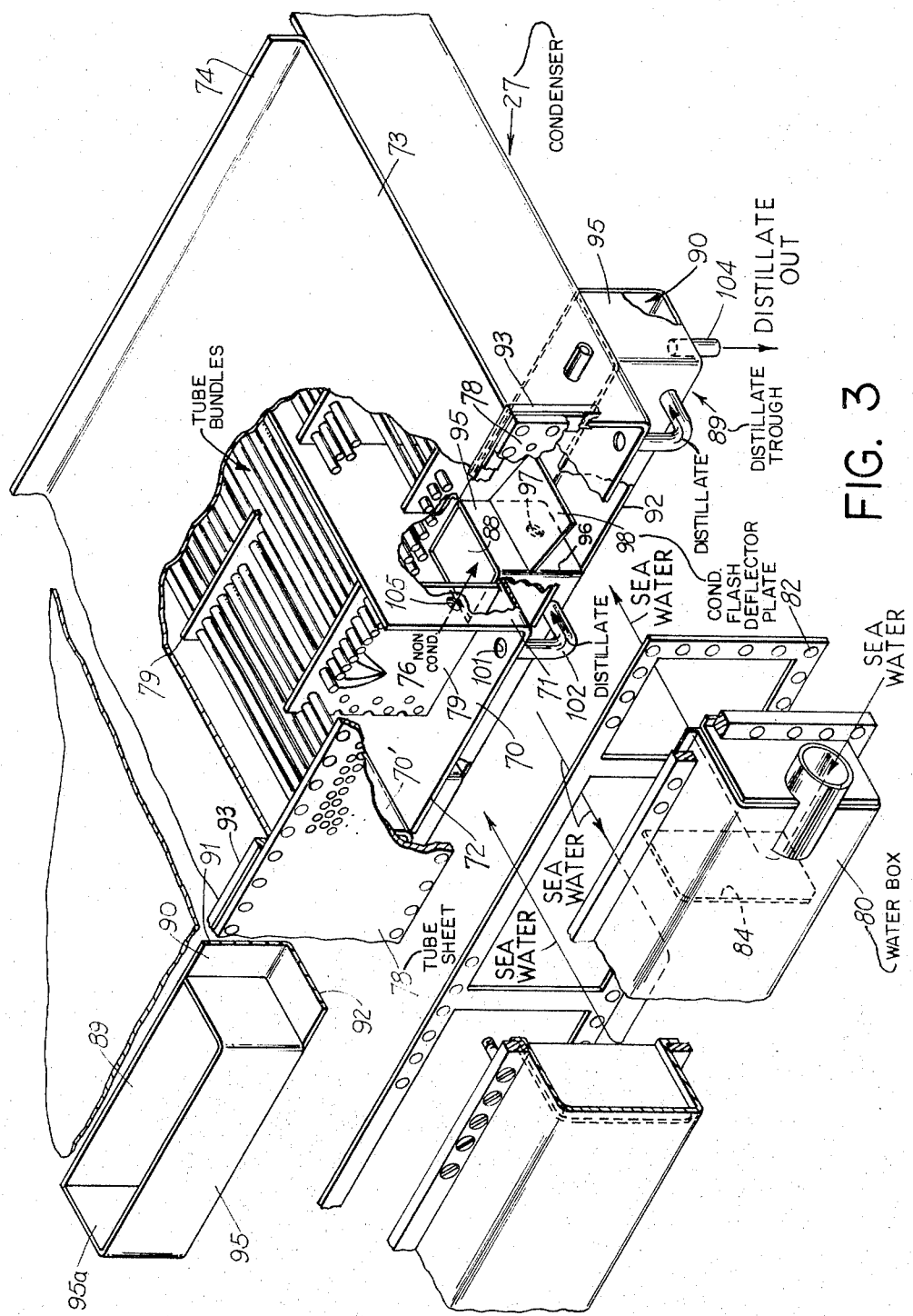

EVAPORATOR FABRICATED FROM PRE-FORMED SHEETS

This invention relates to a novel design and construction of flash evaporator apparatus of the type useful for making fresh water from sea water, or for concentrating a liquid.

Multi-stage flash evaporator apparatus of the type commonly used at land based installations for producing fresh water typically is comprised of a succession of serially connected flash chambers and their associated serially connected vapor condensing means. The flash chambers commonly are in the form of hollow rectangular prisms or shells which are made by welding together flat metal plates. The housing for the condensing apparatus commonly is fabricated in the same manner. Consequently, the fabrication of a multi-stage evaporator involves an exceedingly great amount of welding of flat metal plates and sheets. Not only is it expensive and time consuming just to produce the welds themselves, but because the welds must be structurally strong and substantially impervious to fluids as to assure that vapor and fresh water condensate is not contaminated by the sea water or brine that flows in other parts of the apparatus, the welds must be nondestructively inspected and/or hydrostatically tested to asure that proper welds are made. Many of the welds that are made in the fabricating method mentioned above are at regions that are not readily accessible from the exterior of the apparatus. If rework of welds is required after a significant amount of fabrication has been completed, this rework may involve a major undertaking and may involve cutting an opening in an exterior wall to gain access to a faulty weld. This is costly and time consuming.

By practicing the present invention I am able to eliminate many welds that formerly were required in the fabrication of the apparatus, and am able to simplify the construction and to considerably reduce the cost of the apparatus. I achieve these advantages and savings by constructing the apparatus largely from pre-formed metallic members that have been bent in such configurations as to inherently provide two or more adjacent walls or adjacent structural members. With the use of pre-bent and shaped members of this type I am able to eliminate a considerable amount of welding and inherently am assured of fluid impervious connection between many adjacent walls and parts. I am able to construct the evaporator apparatus so as to have a minimum number of interior welds. Furthermore, the use of similarly pre-bent members permits a systematic and simple modular type fabrication technique. Because it is cheaper and faster to bend and/or shape one large continuous sheet of metal rather than to weld two smaller pieces together at an angular joint, construction costs are significantly reduced.

The above-mentioned advantageous features of this invention, together with others to be discussed below, will be described by referring to the accompanying drawing wherein:

FIG. 1 is a simplified flow diagram illustrating a common type of evaporator system in which the present invention may be utilized;

FIG. 2 is a perspective view, partially broken away, illustrating portions of an evaporator stage constructed in accordance with this invention;

FIG. 3 is a perspective view, partially broken away and partially exploded, illustrating the condenser section of an evaporator stage illustrated in FIG. 2.

Figure 4:
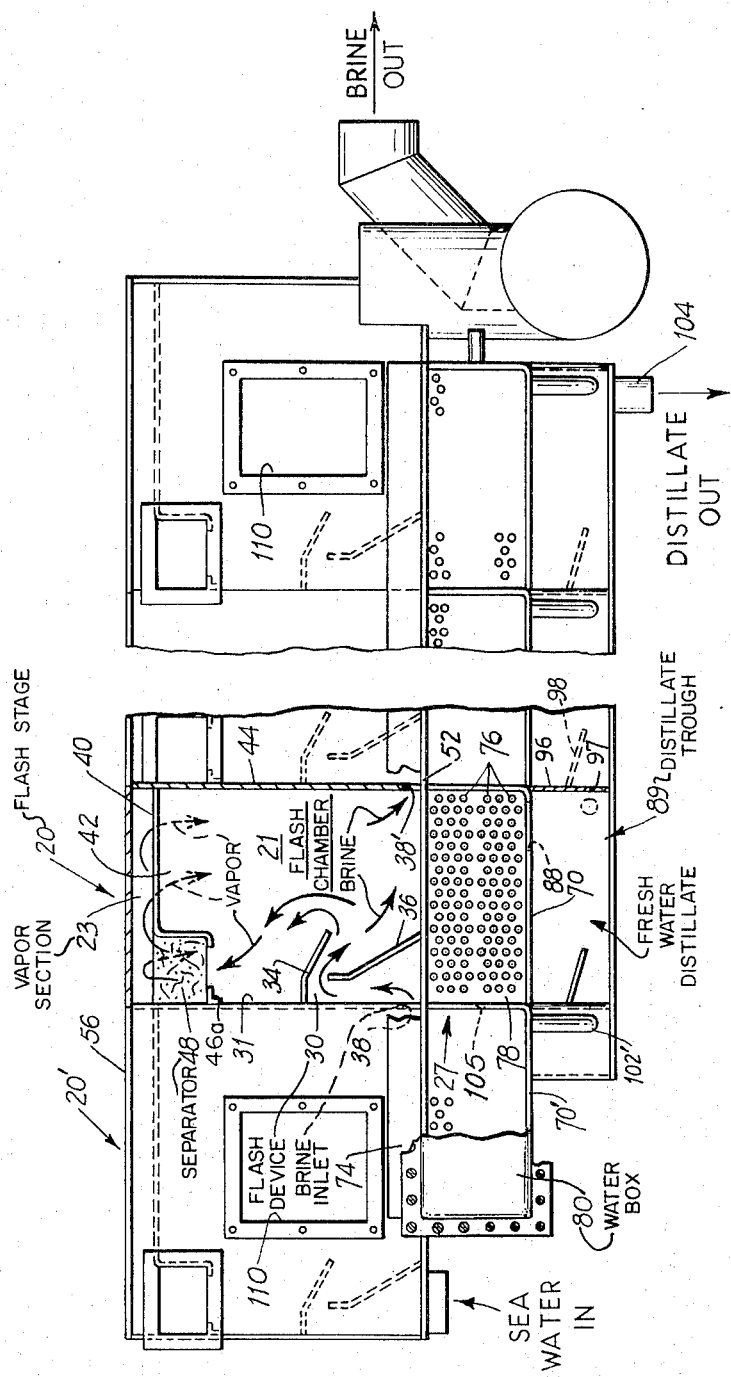
FIG. 4 is a sectional view taken through a vertical plane of successive evaporator stages constructed in accordance with this invention.

In principle, a multi-stage flash evaporator system of the type under consideration may be similar to well known systems exemplified by the simplified flow diagram of FIG. 1. The system is comprised of a succession of stages numbered one through n, wherein each stage includes a flash chamber and a condenser, and wherein each successively higher numbered stage is operated at a successively lower temperature and pressure. Sea water is brought in through pipe 10 and is passed through heat exchange means 11 in the $n^{th}$ stage condenser and then is successively passed through the heat exchange means of the successively lower numbered condensers. The heated sea water then is raised to its highest temperature in a heat exchanger 14 whose heat input may be steam or hot exhaust gases. The heated sea water then is passed to the first flash stage where a portion of its flashes into vapor and the remaining liquid is passed to the second flash stage. Vapor produced in the first stage flash chamber passes to the first stage condenser where it condenses and is piped to distillate output pipe 16 as fresh water distillate.

Brine output from the first stage enters the second stage where a portion of its flashes into vapor which then passes to the second stage condenser. Distillate from the first stage condenser is introduced to the second stage condenser where it flashes, the vapor produced thereby joining the vapor produced in the second stage flash chamber, and the combined vapors being substantially completely condensed and joining unflashed distillate from the first stage condenser and then passing as distillate to the third stage condenser.

The unflashed brine in the second stage flash chamber passes to the third stage flash chamber and the above-described process continues. The described process continues in each successively higher numbered stage. Because multi-stage systems of this type, and variations thereof, are well understood by those skilled in the art, further explanation is believed unnecessary.

FIGS. 2-4 illustrate portions of a flash evaporator constructed and arranged according to the present invention. Because the successive stages are constructed and arranged similarly, except for relatively minor differences which are required in the input and output stages, just one intermediate stage will be described in detail. Intermediate stage 20 generally is in the shape of a hollow rectangular prism or shell which includes a flash chamber 21, a vapor portion 23, and a condenser 27.

Flash chamber 21 includes a flash device 30 located adjacent the front wall 31 for flashing incoming brine. Flash device 30 is illustrated to be of the evaginated venturi type described in U.S. Pat. No. 3,418,213 and is comprised of a top plate member 34 which is secured as by welding to front wall 31 and which terminates at its opposite end in a downwardly turned section. A second plate member 36 is welded to and extends upwardly from the bottom wall or floor of the chamber and is inclined toward front wall 31. The two plate members 34 and 36 form a narrow restricted opening for the discharge of brine which enters the stage by means of the inlet passage 38 in the bottom portion of front wall 31. If desired, the flash device may be of the adjustable valve venturi type disclosed in U.S. Pat. No. 3,461,038, wherein the opening between plate members 34 and 36 is adjusted by a horizontal cylindrical valve which is disposed between the two plate members to control the flow of liquid therebetween.

The far side wall 42 and floor 52 of flash chamber 21 are formed from an elongated continuous flat sheet of metal which, prior to assembly, has been bent in a small-radius, substantially right angle bend throughout its longitudinal extent to form second and first planar arm portions respectively which constitute far side wall 42 and bottom wall or floor 52. The continuous sheet of metal that forms far side wall 42 and floor 52 of stage 20 extends through all stages of the multi-stage evaporator and forms corresponding far side walls and floor for the flash chambers of all stages. In practice, one unitary sheet may not be obtainable in the desired length to extend through all stages of the multi-stage evaporator. In this instance, a plurality of shorter flat plates are butt welded across their width dimensions to form a continuous or unitary elongated flat sheet of the desired length. Before this flat sheet is bent to form the far side walls and floors of all stages, the welds may be inspected, as by X-raying, to assure the integrity of the welds. After inspection, the elongated continuous sheet then is passed through a bender brake to impart the longitudinally extending right angle bend. Thus with one elongated pre-formed sheet of material, a side wall and floor is provided for each stage of the multi-stage evaporator.

The near side walls 43 and back wall 44 of flash chamber 21 comprise the two legs of a unitary L-shaped sheet of metal which prior to assembly has been bent or formed across its width dimension to make a small radius substantially right angle bend 50. As illustrated in FIG. 2, stage 20' which is immediately to the left of stage 20 is substantially identical to stage 20 and its near side wall 43' and back wall 44' also are formed from the two legs of an identical unitary L-shaped pre-formed sheet of metal. The portion of the bent sheet of stage 20' that forms the back wall of that stage is common to stage 20 and forms the front wall of stage 20. In practice, in constructing an evaporator comprised of multiple stages, a succession of pre-formed L-shaped sheets are placed on edge and are longitudinally aligned along floor 52 to form the respective side and common front and back walls of successive stages of the multi-stage evaporator.

The L-shaped unitary sheet of metal which is to be bent to form near side wall 43 and back wall 44 is provided with a cut-out which will form the brine inlet 38' to the next higher numbered stage. As is evident from FIG. 2, the bottom edge of near side wall 43 is welded to the outermost edge of floor 52 and the bottom edge of back wall 44 is welded transversely across floor 52. The left edge of near side wall 43 is welded along the right angle bend 50' of the pre-formed metal sheet that forms walls 43' and 44' of the previous stage 40°. Similarly, the right hand or outermost edge of back wall 44 is welded to the far side wall 42, provision having been made for a short section of back wall 44 to extend above the top edge of side wall 42, as illustrated at the top right corner of FIG. 2. Successive stages of the evaporator are made in the same manner as described above for stage 20.

The top or roof of the flash chamber is formed by a pre-formed mesh support plate 40 which is welded along three of its edges to the two side walls 42 and 43 and to back wall 44. The left end of mesh support plate is bent downwardly and then horizontally to form a supporting bracket 46 which together with another support bracket welded to front wall 31 supports wire mesh separator 48.

Brine which enters inlet passage 38 is discharged through flash device 30 and is directed in a horizontal and downward direction across flash chamber 21. A portion of the liquid flashes into vapor and the remaining liquid falls to the bottom of the chamber and passes through passage 38' which is the brine inlet passage for the next higher numbered stage. Vapor formed in chamber 21 rises and reverses direction of flow back toward front wall 31 and then enters wire mesh separator 48. A primary separation of vapor and entrained mist is accomplished due to the reversal of direction of the vapor in chamber 21, and a secondary separation of the remaining entrained mist from the vapor is accomplished in separator 48.

The vapor then enters the vapor portion 23 section, FIG. 4, of stage 20. Vapor section 23 is comprised of a top portion which extends from the top of mesh support plate 40 to the bottom surface of a cover plate 56 which may be flat elongated continuous sheet of metal which extends throughout the length of the multi-stage evaporator and which serves as a cover plate for all stages.

Vapor in stage 20 then passes over the top edge of far side wall 42 and downwardly through a continuation of the passage which is formed in part by the pre-formed L-shaped outer shell member 60. The leg 61 of outer shell member 60 is welded along a major portion of its edge to the back side of the elongated continuous bent sheet that forms far side wall 42. The upper edge portion of leg 61 is welded to the upper edge portion of back wall 44. As viewed in FIG. 2, the left edge on leg 62 of shell member 60 is welded to the angled edge of pre-formed outer shell member 60' of the adjacent stage 20' so that the two legs 61 and 61' in stages 20 and 20', the longitudinally extending leg 62 of L-shaped outer shell member 60, and the back side of far side wall 42 form a bounded vertical flow path for the vapor produced in flash chamber 21. All stages of the multi-stage evaporator have a pre-formed L-shaped outer shell member such as member 60 and these members are successively arranged and welded in the same manner as the members 60 and 60' described above.

The condenser 27 for condensing vapor produced in stage 20 is located below the flash chamber 21 and is comprised of another pre-formed unitary sheet of metal that is bent into the L-shaped member 70 whose shorter leg forms one side wall 71 of the condenser section and whose longer leg 72 forms the bottom or floor of the section. As seen in FIGS. 2 and 3, the left edge of leg 72 is welded to the angled edge of the similar pre-formed L-shaped member 70' of the condenser section of the adjacent stage 20'. The top wall of cover plate 73 of the condenser section may be a continuous elongated sheet of metal that extends across the tops of all condenser sections of the multi-stage evaporator. The inward end 74 of cover plate 73 has been pre-formed to provide an upwardly extending flange 74 that is welded along the outer surfaces of the successive side walls 43 of the successive stages of the evaporator.

Bundles of U-tubes 76 extend throughout the length of each condenser section 27 and are supported at their near ends, as viewed in FIGS. 2 and 3, by a tube sheet 78 and are supported at intermediate regions along their lengths by spaced baffle plates 79 which extend alternately from side walls of the condenser.

Infeed sea water is passed into and between the U-tube bundles by means of a water box 80 which is made from an elongated continuous sheet of metal which has been pre-formed into a U-shaped channel member whose open side is secured to tube sheet 78 by means including gasket 82. Baffles 84 which are secured within water box 80 direct the sea water into one side of a tube bundle and direct sea water received from the other side of that tube bundle on to the adjacent tube bundle of the next lower numbered stage. The channel shaped water box 80 may extend as a unitary member throughout the entire length of the multi-stage evaporator in the same manner as described above for cover members 56, 73 and the pre-formed continuous sheet that forms far side wall 42 and floor 52 of the flash chambers.

As the vapor follows its serpentine path through through the bundle of U-tubes 76, a major portion of it will condense and fall to the floor of the condenser section as fresh water distillate. This distillate will drain through a rectangularly-shaped cut-out 88 in the floor of the condenser stage and will enter distillate trough 89 which also is fabricated in accordance with principles of this invention. As best seen in FIG. 3, distillate trough 89 is formed from an elongated pre-formed sheet of metal which has been bent along its length into an angle flange 90 wherein the legs 91 and 92 of the flange form the side and bottom walls of the trough. Flange 90 extends as a unitary member throughout the length of the multi-stage evaporator to receive and collect distillate from the respective condenser sections. Distillate trough 90 is divided into respective sections corresponding to and associated with a respective condenser section by means of angled flange members 95 which have a right angle bend formed across their width dimension and which are successively inserted on edge into and then welded to the near edge of elongated flange member 90 so as to form a succession of bounded compartments in distillate trough 89. At the extreme left end of distillate trough 90 the angled flanged member 95 is U-shaped so as to also provide an end wall 95a that closes the left end of the trough.

The leg 96 of angled flange member 95 has an aperture 97 therein to permit distillate to successively cascade from the distillate trough compartment of one stage to the compartment of the next higher numbered stage where its joins the distillate collected in that next stage. The distillate flashes as it passes through aperture 97. A deflector plate 98 directs the flashing distillate across the distillate chamber. Vapor rising from the flashing distillate passes upwardly through cut-out 88 in the respective stage and makes a short pass through the near end of U-tubes 76 where it is condensed. This distillate in condenser section 27 drains through aperture 101 and pipe 102 into the distillate trough of that stage. At the last stage of the evaporator, distillate is drained from the right end of distillate trough 90 by means of output pipe 104.

A minor fraction of the vapor and noncondensable gases from each condenser section pass through an aperture 105 in the vertical leg 71 of member 70. These gases successively cascade through the higher numbered stages of the evaporator.

The above description has been directed primarily to an intermediate stage 20 of a multi-stage evaporator. The intermediate stages and the highest numbered end stage, i.e., the last stage, all will be fabricated substantially as described since the various adjacent L-shaped members inherently form closed structures when assembled as described. The first, or lowest numbered, stage would have a front wall corresponding to front wall 31 of stage 20, however, if a similar L-shaped member were used to provide a near side wall and the back wall. To provide a front wall in the first stage, a pre-shaped member having a U shape rather than an L shape may be utilized. The U-shaped member thereby provides both the front and back walls and the near side wall of the first flash chamber just as the U-shaped member 95a does in the distillate trough, as illustrated at the upper left corner of FIG. 3. Of course, an L-shaped member may be used for the near side and back walls of the first flash chamber and a flat sheet may be welded to the assembled evaporator to close the input end. The same considerations apply to the condenser section of the first stage.

Evaporators constructed in accordance with the present invention may be made in modular form wherein a basic completed unit might have six or eight stages, for example. If a greater output capacity is required than can be provided by one basic unit, a second identical unit, or more if necessary, may be connected in series with the first unit and the operating parameters of the system adjusted so as to produce the desired output. This means that the manufacturer need design one basic type of unit and need provide tooling for pre-forming a minimum number of structural members. Of course, there is a practical limit to the flexibility afforded by the above approach. For very large capacity plants, the basic pre-formed members may have to be larger in order that each individual stage will be of larger volume and capacity.

As is evident from the above description, extensive use has been made of pre-formed members which have one or more small radius substantially right angle bends across one dimension so as to provide adjacent walls or adjacent structural members of the evaporator. The desired bends may be formed in the various continuous sheets by means of a bender brake which may be any of a number of commercially available types that are found in metal fabricating shops. The bending of metal plates or sheets is less time consuming than welding together flat metal plates, particularly where an angle joint is involved, is more accurate, and reduces the possibility of having to rework faulty weld joints that are at hard to reach locations in a fabricated evaporator.

In assembling an evaporator from pre-formed bent sheets, fewer parts are involved so that the assembly and fabrication efforts are considerably lessened, as will be evident from the following description of a typical fabrication procedure. In this description, only unprimed reference numerals will be used in referring to various members and parts in an effort to simplify the description.

As a beginning, an elongated continuous sheet of metal is obtained, or is fabricated as described above, and is bent throughout its length to form the far side wall 42 and floor 52 for all stages of the basic multi-stage evaporator unit. Assuming that the basic unit is to have eight stages, the first one of eight pre-formed unitary L-shaped members is placed on edge on the floor portion to form the near side wall 43 and back wall 44 of the first flash chamber. The width dimension of the L-shaped members are greater than the vertical leg 42 of the elongated continuous sheet. As previously mentioned, this first member may be a U-shaped member in which case the front or end wall of the first flash chamber also would be provided. The L-shaped, or U-shaped member is welded along its bottom edge and along its far side vertical edge to the floor and far side wall 42 respectively provided by the pre-formed elongated continuous sheet. If the physical dimensions of a flash chamber are large enough to permit a welder to work within the four side walls of a flash chamber, the remaining pre-formed L-shaped members that comprise near side and back walls may be successively welded in place to close in the walls of all flash chambers. If because of space limitations it will be difficult or impossible for a welder to work within a flash chamber, before the second and successive L-shaped members are welded in place to form near side walls and back walls it would be desirable for the welder to weld to the transverse leg of the first L-shaped member the members 34 and 36 which form the flash device 30.

Proceeding with the assumption that all eight L-shaped members have been welded in place to close the four sides of all eight flash chambers, including the first stage, the next step would be to successively weld into place the pre-formed sheets which form the roof 40 and mesh support bracket 46 of the stages. An additional support bracket 46a is welded into place in each stage to support the left side of the mesh separator.

The vertical vapor passages for the stages are next formed by successively welding into place the L-shaped outer shell members 60.

The condenser sections next are formed by successively welding into place the L-shaped members whose legs 70 and 71 form the floor and side walls of the condenser sections. The far ends of legs 70 and 71 are welded to respective outer shell members 60 and the top edges of legs 71 are welded to the bottom surface of the continuous floor of the flash chambers.

The pre-formed cover plate 73 having the upturned flange 74 is welded to the top edges of vertical legs 71 of the respective condenser section 27 and to the outer surfaces of near side walls 43 of the respective flash stages. Cover plate 73 may be a continuous sheet that extends throughout all stages of a basic multi-stage evaporator unit, or if the evaporator is very large in size, individual pre-formed members may be successively welded in place to close the tops of the respective condenser sections.

The continuous elongated angled flange 90 that provides side wall 91 and bottom wall 92 of the distillate trough 89 then is welded to the bottom surfaces of the floors 70 of the condenser sections, and the angled flange members 95 are placed on edge along bottom wall 92 of the distillate trough and are welded in place to provide the respective sections therein. As the angled flange members 95 are successively welded in place, the respective deflector plates 98 are in turn successively welded in place on the front wall of each compartment of the distillate trough.

Tube sheet flange 93 is welded to the open ends of the condenser sections 27.

At this point in the fabrication, top cover plate 56 for all stages of the evaporator may be welded into place. This may be done at an earlier time, if so desired.

The bundles of U-tubes 76 with tube sheet 78 and deflector plates 79 are then inserted within the respective condenser sections. Pre-formed and pre-fabricated water box 80 and its gasket 82 then is bolted onto tube sheet flange 93.

Wire mesh separators 48 may next be inserted into the respective stages and cover plates therefore secured to near side walls 43.

As illustrated best in FIG. 4, it is common to provide a large access port 110 in a side wall of each flash stage. The cover plate for these access ports next may be inserted.

Plumbing and piping connections, and installation of meters, gauges and other intruments will be made in accordance with standard practice, and in a sequence compatible with the above-described fabrication sequence.

It is to be understood that features such as cutouts, apertures, passage ways through walls, etc. will be made before assembly of the various sheets and members so that the use of the term pre-formed should be understood to include the provision of such features.

What is claimed is;

1. In a multi-stage flash evaporator that includes a longitudinal succession of hollow rectangular prisms forming successive continuous flash chambers, the combination comprising a pre-formed L-shaped elongated continuous sheet of material extending longitudinally throughout a plurality of said stages and having a first small-radius substantially right angle bend throughout its longitudinal extent to connect first and second angularly disposed planar arm portions, said bent continuous sheet being arranged with its first planar arm portion disposed horizontally to form floors for adjacent ones of successive flash chambers and having its second planar arm portion extending vertically and longitudinally to form side walls for adjacent ones of successive flash chambers, a plurality of first pre-formed substantially L-shaped members each formed of a unitary sheet of material having a small-radius substantially right angle bend across its width dimension to provide an angled edge portion between two angularly disposed planar leg portions, said first L-shaped members being successively arranged so as said radius bend is substantially vertical and the bottom edge of the first leg portion of each first member is aligned along and welded to the outermost longitudinal edge of the first planar arm portion of said elongated sheet and with the bottom edge of its second leg portion extending transversely across and also welded to said first planar arm portion and said second leg portion terminating at its outermost edge in a welded joint with the interior face of said vertically disposed second arm portion, the vertical edge of the first leg portion of each of said first L-shaped members being welded along its outermost edge to the angled edge portion of the immediately adjacent L-shaped member, whereby the second leg portions of said L-shaped members form transverse vertical back and front walls, respectively, of adjacent flash chambers, liquid input means in the lower part of each of said front walls for permitting liquid flow from flash chamber to flash chamber, declined plate flashing means associated with the downstream side of each input means for flashing into vapor at least a portion of the liquid entering each flash chamber, a roof disposed across each flash chamber, separator means in the roof and top portion of each flash chamber for separating vapor and entrained mist produced in the respective flash chamber.

2. The combination claimed in claim 1 wherein the endmost L-shaped member which does not enclose a chamber is pre-formed to have a second small-radius right angle bend across its width dimension to provide a third leg portion that is parallel to the transverse leg portion of that member thus providing a U-shaped member, whereby said endmost member provides both front and back walls of an end flash chamber.

3. The combination claimed in claim 2 and further including a plurality of pre-formed second L-shaped members each formed of a unitary sheet of material having a small-radius right angle bend across its width dimension to provide short transverse and longitudinal leg portions, said second L-shaped members being disposed longitudinally in succession on the side of the second arm of the elongated continuous member opposite said first L-shaped members and arranged with their width dimensions extending vertically and of the same height as said first L-shaped members but higher than said second arm of the elongated continuous member, the transverse leg portions of the second L-shaped members being aligned and coplanar with the transversely extending legs of the first L-shaped members and the innermost vertical edge of each transverse leg portion of a second L-shaped member being welded to said second arm of the elongated continuous member, the outermost vertical edge of the longitudinal arm of each of the second L-shaped members except the end one opposite the U-shaped member being welded along lthe radius angle bend of an adjacent second L-shaped member said end second L-shaped member being formed with a second radius bend to provide another short transverse leg portion parallel to said first mentioned short transverse leg portion and thus forming said end second L-shaped member as U-shaped, thereby to form a vertically disposed vapor passageway for each stage of said multi-stage evaporator said second L-shaped member extending below said second planar arm portion of said continuous sheet.

4. The combination claimed in claim 3 wherein said separator means is disposed in the roof of each flash chamber, whereby vapor produced in each chamber passes through said separator, and wherein said roof across each flash chamber is horizontally disposed at the top edge of said vertical second planar arm of the elongated continuous sheet and is welded to same as wall as to the separator, said combination further including a longitudinally extending unitary flat cover sheet disposed horizontally across the top edges of the first and second L-shaped members of each stage of the evaporator, thereby to form in each stage a horizontal vapor passage between said roof and cover plate, said horizontal vapor passage being in communication with said vertical vapor passage.

5. The combination claimed in claim 4 and further including, a plurality of condenser means containing chambers each respectively disposed continuously below a respective one of said flash chambers and in communication with the vertical vapor passage of its respective stage, said condenser means comprising, a plurality of pre-formed third L-shaped members each formed of a unitary sheet of material having a small-radius substantially right angle bend across one dimension, of greater length than the transverse width of the continuous sheet, to form a long longitudinal floor portion and a shallow wide wall portion, said third L-shaped members being arranged in contiguous succession along the longitudinal extent of said evaporator with the side wall portions thereof being parallel to and coplanar with the second leg portion of said first mentioned L-shaped members and extending transversely to the direction of liquid flow in said flash chambers, the transversely directed outermost edge of each floor portion of the third L-shaped members being welded to the right angled bend of a next adjacent upstream third L-shaped member, and being also welded to the bottom edges of the second L-shaped members as well as to the free vertical edge of the transverse leg portion thereof and at least a portion of the top edge of each side wall portion of each third L-shaped member being welded to the bottom surface of the elongated continuous sheet that forms floors of the flash chambers, fourth L-shaped members arranged in contiguous juxtaposition with their horizontal legs welded to and forming the roofs of the excess lengths of the respective condensing means and their short vertical legs being welded to their corresponding longitudinally extending legs of the first mentioned L-shaped members, heat transfer means disposed within said third L-shaped members for condensing vapor passing through the respective condensing means, and means for collecting distillate formed in said condensing means.

6. A flash evaporator chamber in the form of a hollow rectangular prism, comprising a first pre-formed continuous sheet of material having a small radius substantially right angle bend across one dimension thereof to provide first and second angularly disposed planar arm portions extending outwardly from said bend, the first planar arm portion of the continuous sheet being disposed horizontally to provide a floor for said chamber and the second planar arm portion being disposed vertically to provide a first side wall of the chamber, a second pre-formed L-shaped continuous sheet of material having a small radius substantially right angle bend across one dimension thereof to provide first and second angularly disposed planar leg portions which extend outwardly from said bend, said second L-shaped sheet being disposed on edge with the angled edge formed by said bend extending vertically, said second L-shaped sheet being arranged in contact with said first continuous sheet and with its first leg portion parallel to and spaced from first side wall, thereby to form a second side wall of said chamber, and with its second leg portion perpendicular to said two side walls and perpendicular to and extending across said floor, thereby to form a front or back wall of said chamber, said first leg portion being welded along its bottom edge to the first planar arm portion of the first continuous sheet, said second leg portion being welded along at least a portion of its bottom edge and along its outermost edge, respectively, to said first and second arm portions of said first continuous sheet, means providing a roof at the level of the upper edge of the second arm of the first sheet and means providing the other of said front or back wall for completing the configuration of said hollow rectangular prism, and means in said front and back wall, respectively, for admitting and discharging liquid from said chamber.

7. The flash evaporator chamber claimed in claim 6 and further including, a third pre-formed L-shaped continuous sheet of material having a small radius substantially right angle bend across one dimension thereof to provide third and fourth angularly disposed planar leg portions which extend outwardly from said bend, said bend being oriented vertically, said third pre-formed L-shaped sheet being disposed on the outside surface of the second arm of the first continuous sheet with the innermost edge of the third leg extending vertically and being welded to said outside surface of said second arm but coplanar with the second leg portion of said second L-shaped sheet and with said fourth leg portion being disposed parallel to the second arm of the first pre-formed sheet, the topmost portions of the first and second pre-formed L-shaped sheets extending above the top of the second arm of the first pre-formed sheet, means forming a vertical transverse wall between said outside surface of the second arm of the first pre-formed continuous sheet and the outermost remaining vertical edge of the fourth leg on said third pre-formed L-shaped sheet, said wall being coplanar with the other front or back wall and welded to said second arm portion and said remaining vertical edge respectively, and means extending across the tops of the first and second pre-formed L-shaped sheets for providing a cover plate for said flash chamber and for providing a vapor passageway above said roof and in the space between the first pre-formed sheet and the second pre-formed L-shaped sheet.

8. The combination claimed in claim 7 and further including, a fourth pre-formed L-shaped continuous sheet of material having horizontal and vertical legs and disposed below the first arm of the first pre-formed continuous sheet with the uppermost edge of its vertical leg welded to the bottom surface of said first arm of the first pre-formed continuous sheet, said vertical leg being coplanar with said second leg portion of said second pre-formed sheet and welded to said first arm portion, means providing a vertical transverse wall between the outermost end of the horizontal leg of the fourth pre-formed L-shaped sheet and said bottom surface of the first arm of the first pre-formed continuous sheet and being welded thereto, and transverse, horizontal, U-shaped heat exchange tubes disposed within the space bounded by said last named means, the fourth pre-formed L-shaped sheet and said bottom surface of the first pre-formed continuous sheet.

9. The combination claimed in claim 8 and further including, a U-shaped water box pre-formed of a unitary sheet of material for receiving liquid to be passed to said heat exchange tubes, means for securing the U-shaped water box to the space occupied by the heat exchange tubes to pass said liquid to said tubes, and means for receiving condensate produced by said heat exchange means.

* * * * *